June 21, 1927.
W. J. DE WITT
SHOE FORM
Filed May 12, 1926
1,632,955
4 Sheets-Sheet 1
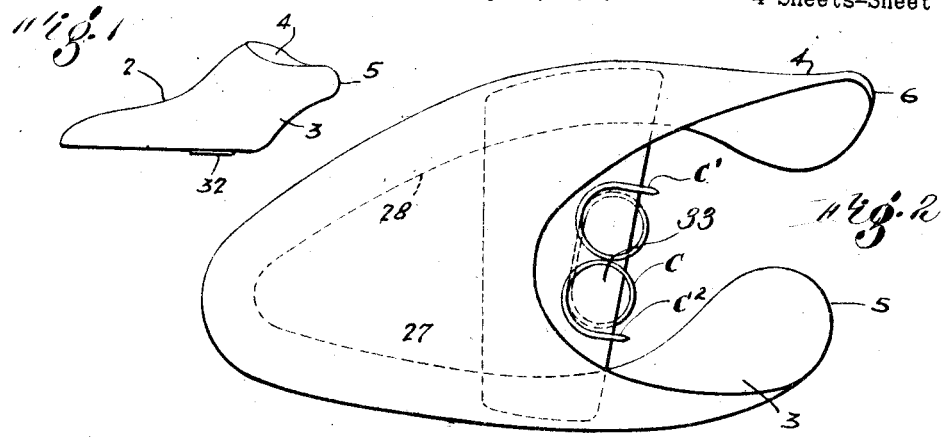
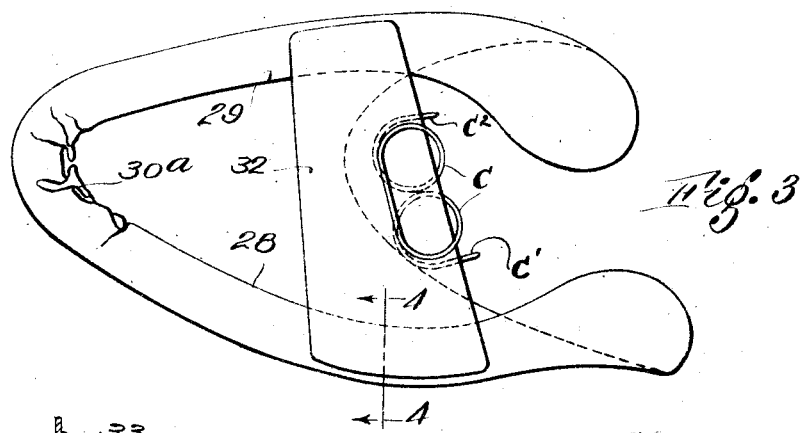
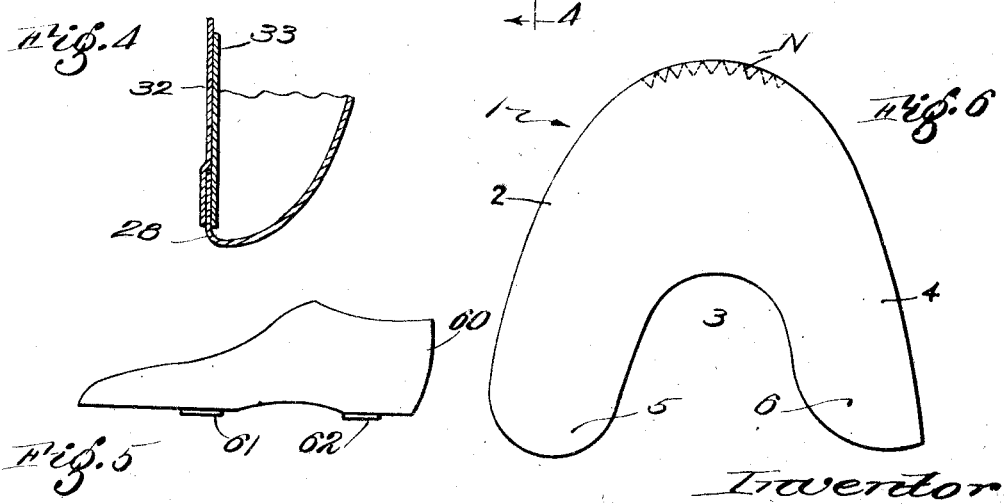
Inventor
William J. DeWitt
by Roberts Cushman & Woodberry
Attys.

June 21, 1927.

W. J. DE WITT 1,632,955

SHOE FORM

Filed May 12, 1926

Inventor
William J. DeWitt.
by Roberts Cushman & Woodberry
Attys.

June 21, 1927.
W. J. DE WITT
SHOE FORM
Filed May 12, 1926 4 Sheets-Sheet 3
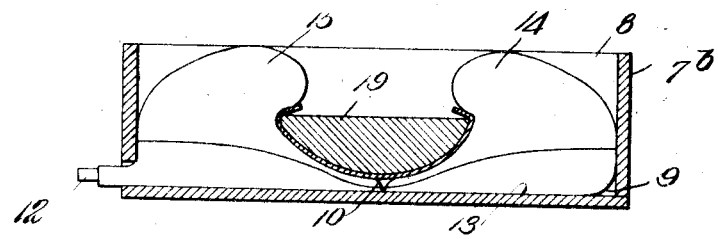
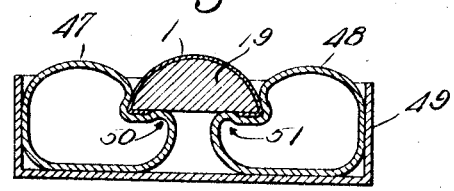
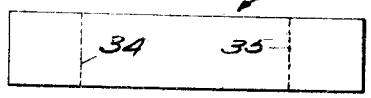
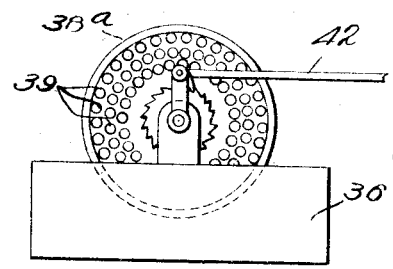
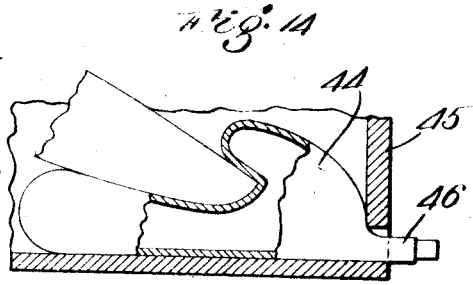
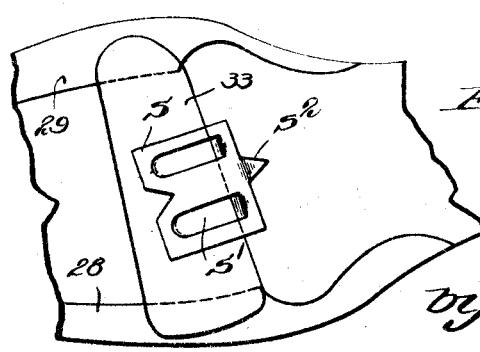
Inventor
William J. DeWitt
by Roberts Cushman Woodberry
Attys.

June 21, 1927.
W. J. DE WITT
SHOE FORM
Filed May 12, 1926
1,632,955
4 Sheets-Sheet 4
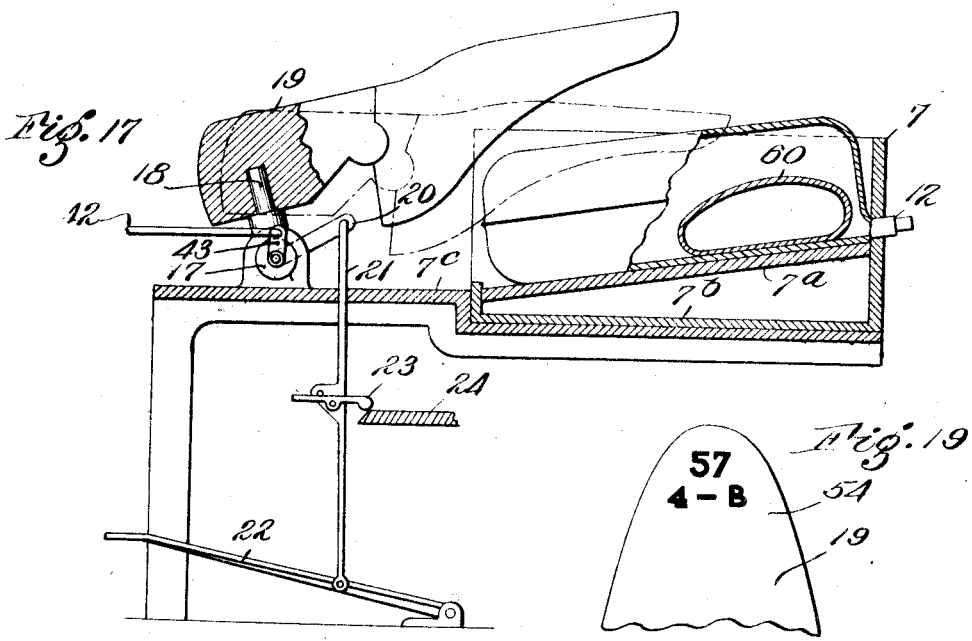

Patented June 21, 1927.

1,632,955

UNITED STATES PATENT OFFICE.

WILLIAM J. DE WITT, OF AUBURN, NEW YORK.

SHOE FORM.

Application filed May 12, 1926. Serial No. 108,539.

This invention pertains to hollow thin walled forms, for example, shaping forms or fillers for shoes, the present application being a part continuation of my application Serial No. 5,746 filed January 30, 1925.

Forms of the kind herein disclosed constitute one species of the genus which includes devices variously termed forms, trees, stiffeners, etc., some of which are intended for insertion in a finished shoe to preserve its shape temporarily while on exhibition or during intervals of wear, while others, for example, toe-boxes, counters, etc., are adapted to be incorporated in shoes during the course of manufacture, the embodiment of the invention herein chosen for illustration being of that species which is placed temporarily in the completed or partially completed shoe when not in use, although it is contemplated that in some of its broader aspects the invention may be found useful in respect to devices belonging to other species of the genus.

While forms, such as herein disclosed are of utility under many circumstances, as, for example, for keeping shoes plumped out, smooth, and free from wrinkles while exposed for sale in shoe cases or store windows, they are designed primarily for the use of traveling salesmen to enable them to hold their sample shoes in proper shape during transportation and while on exhibition.

For this purpose it is important that the form be flexible and very light in weight while strong enough to fulfil its intended purpose properly, and essential that the outer surface of the form be smooth and substantially an exact replica, both in size and shape, of the last upon which the shoe to be placed thereon was made. It is also important that the size and shape of the form shall not change by reason of variations in temperature or atmospheric moisture.

I am aware that heretofore various attempts have been made to make such forms from plastic or sheet material, but so far as I know, the methods of production employed have all been unduly slow, and involve the use of adhesives, the formation of seams, or slow drying or baking operations which keep the last out of use for a long period, while the finished forms have in most instances been found to be oversized by reason of the necessary thickness of the material employed, and so rigid and unyielding as to impart to the shoe the "feel" of a low-grade leather. Moreover, such forms are heavy, and expensive to produce by the usual methods, and so brittle that they break when too closely packed.

In accordance with the present invention I provide a shoe form of substantially the exact size and shape of the last upon which the shoe is made, such form being of extremely light weight and having the desired stiffness and flexibility and not being affected by variations in temperature or atmospheric humidity, and which is so tough and resilient that it is not easily broken and when deformed tends to resume its original shape.

In the accompanying drawings I have illustrated by way of example a preferred embodiment of my invention, including the improved form itself, various steps in a preferred process of making the form, and certain novel instrumentalities useful in performing such process.

In the drawings:—

Fig. 1 is a side elevation to small scale of a fore-part form removed from the last;

Fig. 2 is a plan view of the same form to larger scale, but provided with a retaining claw;

Fig. 3 is a bottom view of the form upon substantially the same scale as Fig. 2;

Fig. 4 is a fragmentary section substantially on the line 4—4 of Fig. 3;

Fig. 5 is a side elevation illustrating a modified form intended to fill the entire shoe;

Fig. 6 is a plan view of a blank suitable for making a form such as shown in Figs. 1, 2 and 3;

Fig. 9 is a front elevation of the cushion shown in Fig. 7 showing the last and the cushion support in section and the blank at a stage intermediate those shown in Figs. 7 and 8;

Fig. 10 is a vertical transverse section illustrating another appliance useful in performing a later step of the process, the last with the blank carried thereby being shown in section;

Fig. 11 is an edge view of a two-ply cross bar constituting an element of the finished form;

Fig. 12 is a plan view of the cross bar shown in Fig. 11;

Fig. 13 is a side elevation of a device useful in applying adhesive to the cross bar of the form;

Fig. 14 is a vertical section through an appliance somewhat similar to that shown in Fig. 10 but of modified form;

Fig. 15 is a view similar to Fig. 14 but illustrating a different mode of using the appliance;

Fig. 16 is a front elevation of the device shown in Fig. 14, showing a last in transverse section;

Fig. 17 is a side elevation of a machine embodying the cushion of Fig. 7 as an element and adapted to press the last into contact with the cushion to pull or draw the form above the last;

Fig. 18 is a side elevation of an appliance useful in impressing the form with suitable indicia and in flattening and shaping the lower edges of the form;

Fig. 19 is a fragmentary top plan view of the forepart of a last furnished with incised or intaglio indicia for use with the appliance of Fig. 18 in impressing the finished form with identifying indicia; and Fig. 20 is a view similar to Fig. 3 but showing a modified form of retaining claw.

The improved form herein disclosed may be made of any suitable material having the necessary physical characteristics. Among other substances with which I have experimented I have found celluloid and bakelite to be very satisfactory. For convenience in description I have referred hereinafter to celluloid, which may, if desired, be transparent or of any selected color, as the material of the improved form, but so far as the broader aspects of the invention are concerned do not wish to restrict myself to this particular material.

Referring to Fig. 6, the numeral 1 indicates in general a blank of substantially U shape which may be cut or punched from a sheet of the selected material, or which may otherwise be prepared, for example, by moulding the individual blanks from the material in plastic or fluid condition or slicing the blank from a properly shaped block. This blank, by whatever process prepared, comprises the fore-part 2 and the spaced legs 3 and 4 which terminate at the corners 5 and 6 respectively. Preferably, these blanks are unsymmetrical, permitting them to be conformed to right and left lasts without necessitating undue trimming at a later stage in the operation.

Figure 7:
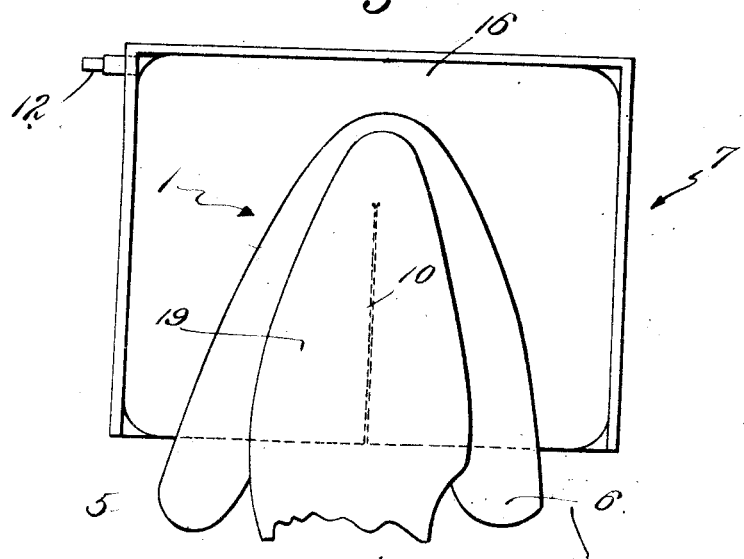
Fig. 7 is a plan view of a steam cushion useful in making the improved form,—showing a blank in position upon the cushion and the fore-part of a last resting upon the blank.
Figure 8:
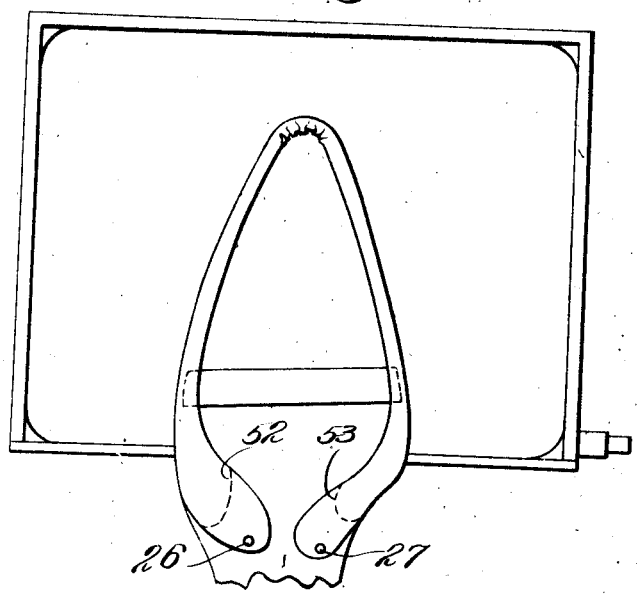
Fig. 8 is a view similar to Fig. 7 but showing the blank and last in a later stage in the process.

While it is possible to conform this blank to a last by hand or by other means than that herein disclosed, I prefer to employ the appliances illustrated in the drawings. The appliance shown more particularly in Figs. 7, 8 and 17 is designated generally by the numeral 7, and consists essentially of a cushion or bag comprising the upper wall 8 and the lower wall 9. Both walls may be of the same material if desired, but it is contemplated that under most circumstances the upper wall will be of some material, for example, textile fabric, which is porous or at least to some extent pervious to steam. This bag preferably rests upon a forwardly inclined support 7ª forming a false bottom for an open topped box 7ᵇ whose sides confine the cushion laterally.

The upper and lower walls of this cushion or bag are preferably, though not necessarily, united by a seam 10 extending from the front of the cushion toward the rear, but terminating at the point 11 at some distance from the rear edge of the cushion. The cushion is provided at a convenient point with an inlet connection 12 through which steam or any other suitable elastic fluid may be admitted to inflate the cushion. By reason of the seam at 10 uniting the upper and lower walls of the cushion the forward part of the cushion when inflated assumes the form of two upwardly convex lobes 14 and 15 respectively whose upper surfaces gradually merge into each other at the rear central part of the cushion as indicated at 15 (Fig. 7).

This cushion may be employed if desired to assist in performing the desired operation without further adjuncts, but it is preferred to combine with the cushion the other mechanical features illustrated in Fig. 17. For this purpose the box 7ᵇ is preferably mounted upon a table or stand 7ᶜ supporting bearings for a shaft 17 extending substantially parallel to the front edge of the cushion and spaced from the latter. This shaft 17 carries an upwardly directed spindle 18 upon which a last 19 may be mounted. The shaft 17 is also furnished with an arm 20 to which a link 21 is connected, the lower end of the link being pivotally secured to a treadle lever 22. Preferably the link 21 is furnished with a locking pawl 23 adapted, when the treadle lever is depressed to pass below and to engage the under surface of a fixed stop 24, thus holding the treadle in its depressed position until the locking pawl 23 is released. The spindle 18 is so disposed that when the shaft 17 is rocked the spindle moves substantially in the vertical plane of the seam 10 of the bag 7.

The first step in the herein described operation of conforming the blank 1 to the last 19 consists in laying the blank upon the upper surface of the bag 7 with its axis of symmetry substantially in the vertical plane of the seam 10 of the bag. It being understood that the bag has already been inflated with hot steam, the heat of the bag, assisted by the moisture condensed from the steam which exudes through the pores of the bag, rapidly softens the blank, and when the last 19 is placed upon the spindle 18 and the treadle lever 22 is depressed, the downwardly swinging fore-part of the last engages the blank at its center and thrusts the latter down into and between the lobes 14 and 15 of the bag or cushion.

As the surface of the blank adheres to some extent to the surface of the cushion this downward thrust tends to drag or draw the side portions of the blank up around the sides of the last while at the same time the toe portion of the blank is conformed to toe of the last. When the treadle has been sufficiently depressed it is locked by engagement of the pawl 23 with the abutment 24, and the operator now seizes the outer corners 5 and 6 of the blank and draws them up over the shank of the last and secures them by means of tracks 26 and 27, or other form of fasteners, for example, a pin or pins projecting from the bottom of the last. This upward and rearward pull exerted at the rear corners of the blank, assisted by the inward bulging of the bag over the bottom of the last, Fig. 9, tends to turn in the upwardly projecting edges of the blank to cause them to overlie the bottom of the last and form flanges 28 and 29 respectively. Due to the fullness of the material at the toe of the last, wrinkles 30 tend to form at this point.

After the steps above described have been completed the treadle is released and the last with the partially moulded form is removed from the steam cushion 7. The toe portion of the last with the form thereon may then be thrust into a pneumatic cushion 44 (Fig. 14) preferably mounted in an open topped box 45 and which is inflated with air through a suitable valve connection 46. This cushion is preferably of cylindrical form, and when the forepart of the last is thrust into its upper wall, the fluid pressure acting in all directions against the blank tends to smooth it and conform it closely to the toe of the last, at the same time cooling the blank and tending to cause it to set.

If desired, either in substitution for or in addition to the last-described step, the last may be thrust right side up between a pair of tubular pneumatic cushions 47 and 48 (Fig. 10) respectively. These cushions are conveniently mounted in a box-like support 49, and when the last is thrust vertically downward between these cushions the action of the cushions is to draw the flange portions of the blank inwardly in opposite directions as indicated by the arrows 50 and 51 in Fig. 10 (thus causing it to lie flat against the bottom of the last). Either or both of the last operations described tend to flatten the wrinkles at the toe portion of the blank, until they assume the shape indicated at $30^a$ in Fig. 3.

At this point or at some later stage in the operation as may be desired, a cross bar 31 is placed across the ball portion of the last and is attached at its opposite ends to the flanges 28 and 29 respectively. This cross bar may consist of a single piece of sheet material similar to that employed in making the body of the form, or any other suitable material if desired. The ends of this cross bar may be attached to the body of the form by staples, adhesive or any other suitable fastening means.

As herein disclosed, I prefer to employ a two-ply cross bar comprising superposed registering strips 32 and 33 respectively, which, as indicated in Figs. 11 and 12, are secured one to the other at their middle portions, for example, between the lines 34 and 35 of Fig. 12 but which are free from each other at their end portions. In applying this two-ply cross bar, the ends of one ply, for example, the ply 33, are slipped between the bottom surface of the last and the flanges 28 and 29 of the form, while the ends of the other ply 32 overlap said flanges.

While as above stated this cross bar may be secured by means of rivets, staples or adhesives, I prefer, when such bar is made of celluloid, to attach it to the body of the blank in a homogeneous or substantially integral manner by the use of a solvent for the celluloid. For applying such solvent in a convenient fashion I prefer to employ the device shown in Fig. 13, which comprises a receptacle 36 for the solvent and a thin disk 38, preferably having a bevelled or V-edge $38^a$, mounted upon a shaft 37 to rotate in a vertical plane with its lower portion dipping into the solvent in the receptacle 36. To facilitate the lifting of solvent by means of the disk I prefer to provide the latter with series of circumferentially spaced recesses or openings 39 extending entirely or part way through the disk. While this disk may be turned in any desired manner, I prefer to provide it with a ratchet wheel $39^a$ and to move the ratchet wheel step by step by means of a lever 40 free to turn on the shaft 37 and carrying a pawl 41 engaging the teeth of the ratchet wheel $39^a$. The lever 40 may be rocked in any suitable manner, for example, by connecting it through a link 42 to an arm 43 projecting from the shaft 17 (Fig. 17) so that at each actuation of the treadle 22 the disk 38 is given a partial rotation.

When the cross bar 31 is to be applied, its plies are separated and straddled over the edge of the disk 38 which simultaneously coats the opposed inner surfaces of the plies with solvent. When the bar is placed in position, its plies embrace the flanges 28 and 29 of the blank and the celluloid solvent attacks the surfaces of the flange and the cross bar and by partially dissolving them causes them to cohere in a homogeneous or integral fashion when the solvent evaporates. The rapid evaporation of the solvent and the final shaping and flattening of the flanges and cross bar is conveniently accomplished by pressing the bottom of the last against the steam bag 7 or some other heated surface and then while the material of the form is still mobile, pressing the bottom of the last against the bag 44 as shown in Fig. 16 which completes the shaping and cools and sets the material. After these operations have been completed the form is allowed to cool completely while upon the last and the corners 5 and 6 are released from the fasteners and trimmed off along the lines 52 and 53 (Fig. 8) thus completing the form.

For the purpose of identifying the finished forms as to the shape and size of the last upon which they were lasted, it is desirable to provide them with suitable indicia during the process of lasting. In accordance with a preferred mode of procedure, the last, as shown for example in Fig. 19, is provided with incised or intaglio indicia such as indicated at 54. Just before the finished form has completely cooled and before it is withdrawn from the last, the last with the form thereon is mounted upon the cushion surface 38 (Fig. 18) (heated if desired) of tilting table 56 pivoted to swing about a horizontal axis 57 upon a base or support 55. This table is then tilted downwardly as indicated in dotted lines in Fig. 18 until the toe portion of the last is brought into forcible engagement with the resilient pressure roll or pad 59. To facilitate the operation the pad may be heated, for example, by a steam jet 59ª. The pressure of this roll or pad causes the material of the blank to sink into the incised indicia on the last and as the blank cools the depressions are retained, thus forming integral indicia upon the form indicating with certainty the particular last upon which the form was made. While this mode of applying indicia is regarded as very desirable, it is, of course, to be understood that the indicia may be provided in other ways and either before or after the completion of the form.

For example, the cushion may be provided with an inner resilient stop pad 60, Fig. 17, preferably consisting of an inflated rubber tube or bag and so positioned that as the last sinks down into the cushion 7 its movement will be limited by engagement with the pad 60. If the last be provided with incised indicia at the toe, the sheet material will be forced into such indicia by the pressure of pad 60, while in any event even though the last be unprovided with such indicia, the pressure of the pad at this point assists in conforming the sheet material to the toe portion of the last.

When the form is made of celluloid, bakelite, or substances of similar physical properties, the material employed may be so thin, while providing all the stiffness necessary, that it does not appreciably differ in its outer size and configuration from that of the last upon which it was made. However, for greater exactness, it may be preferred to subject the last to a preliminary operation to prepare it for the steps of the process above described.

To this end the last may be subjected to heat or a dry atmosphere for a sufficient length of time to reduce its size to an amount equivalent to the thickness of the sheet material which is to be employed in making the form. After the shrinking process the pores of the last are filled or impregnated with a moisture-resistant medium so that the last remains in this shrunken condition indefinitely. When made upon a last so treated, the completed form has an outer configuration and size which is exactly like that of an untreated last of the same size and style so that when the form is placed within a shoe made upon such an untreated last it fills the shoe to the same extent as the last upon which the shoe was made. The shoe thus presents the most attractive appearance possible, being wholly free from wrinkles or protuberances, while the form thus provided is so resilient and flexible that it does not detract from the "feel" of the leather of the shoe and does not materially add to its weight.

Obviously similar results could be obtained by making the last of some material not affected by moisture, for example, bakelite and making the last sufficiently under the standard size to compensate for the added thickness of the hollow form.

In order to retain the form in proper position within the toe of the shoe I may provide it with one or more retaining claws or "diggers" as indicated in Figs. 2, 3 and 20.

In Figs. 2 and 3 the claw device consists of a length of spring wire forming two helical coils C disposed side by side, the coils being closely wound so that adjacent turns of each coil may be sprung apart to receive the rear edge of the cross bar 32, 33 between them. When thus arranged the turns of the coils grip the cross bar with sufficient force to keep the claw device in operative position.

The opposite ends $C^1$ and $C^2$ of the wire forming the coils are bent downwardly and rearwardly and preferably sharpened to provide points or prongs adapted to slip along the inner sole of the shoe as the form is pushed forwardly into operative position, but to oppose rearward movement of the form by digging into the substance of the inner sole.

In Fig. 20 a modified form of claw device is shown, such claw device consisting of a piece of resilient sheet metal S having one or more tabs S' punched therefrom, the tabs and body of the claw device being adapted to grip the cross bar 32, 33 of the form between them. A prong S² extends from the rear edge of the claw device, such prong being bent downwardly and rearwardly to engage the inner surface of the shoe in the same way as the prongs C¹ and C² above described.

It may be noted that the essential features of the invention herein described are applicable to the making of forepart forms such as shown in Figs. 1 to 3 inclusive, or in making whole shoe forms 60 such as shown in Fig. 5. When such a whole shoe form is made, it may be provided with one or more cross bars 61 and 62 respectively as may be deemed desirable, or the necessary stiffness may be secured by increasing the width of the side flanges.

In my copending application, Serial No. 100,667 filed April 8, 1926, I have described the blank as having notches at its toe portion to prevent the formation of plaits or wrinkles in the flange at this part of the form. Obviously similar notches for the same purpose may be provided in the blank shown in Fig. 6 of the present application, the position of such notches being indicated at N by the dotted lines.

I claim:

1. A removable hollow form for temporary insertion in a finished or partially finished shoe, said form consisting of a piece of sheet celluloid conforming with substantial exactitude to the size and contour of the forward portion at least of a shoe last, the space within the form being substantially unobstructed and capable of receiving the forepart at least of a shoe last, said form having a permanent unobstructed opening to permit withdrawal of the last from the completed form or its reinsertion therein.

2. A removable hollow form for temporary insertion in a finished or partially finished shoe, said form consisting of a piece of molded sheet celluloid conforming with substantial exactitude to the size and contour to the forward portion at least of a shoe last, the form narrowing in at the rear of the ball of the last so as snugly to conform to the shank portion of the last, the space within the form being substantially unobstructed and capable of receiving the forepart at least of a shoe last, the form having a permanent unobstructed opening at its top to permit withdrawal of the last from the completed form.

3. A removable hollow thin-walled form for temporary insertion in a finished or partially finished shoe, said form consisting of celluloid shaped to fit snugly against the inner surface of the upper of a shoe, said form having an inturned marginal flange at its lower edge and a cross bar secured at its opposite ends to the flange, the space within the form being capable of receiving the forepart at least of a shoe last, the form having a permanent unobstructed opening to permit withdrawal of the last from the completed form or its reinsertion therein.

4. A shoe form comprising a piece of sheet celluloid moulded to fit snugly within the forepart of the upper of a shoe and having an integral inturned flange extending around its lower edge, and a cross bar consisting of two superposed pieces of sheet celluloid, the ends of one piece being secured to the upper surface of the flange and the ends of the other piece being secured to the lower surface of the flange, the intermediate portions of said pieces being united.

5. A hollow shoe form comprising a piece of sheet celluloid moulded to fit within the forepart of a shoe, said form having a flat cross bar of sheet celluloid connecting the opposite edges of the form, and a metallic claw device fixedly secured to the cross bar, said claw device having a prong projecting downwardly and rearwardly.

6. A hollow shoe form consisting of thin sheet material moulded to fit within a shoe upper, said form being open at the bottom and provided with a transverse cross bar connecting its opposite edges, and a claw device resiliently gripping the cross bar and having a rearwardly and downwardly directed prong adapted to engage the inner surface of the shoe.

7. A hollow shoe form adapted to fit snugly within the forepart of the upper of a shoe, said form having a transverse bar connecting its opposite edges, and a claw device comprising a resilient wire coil adapted to receive and grip the edge of the cross bar between adjacent turns, the end of said coil being sharpened and bent downwardly and rearwardly to provide a retaining prong.

8. A hollow shoe form adapted to fit snugly within the forepart of the upper of a shoe, said form having a transverse bar connecting its opposite edges, and a claw device comprising a length of spring wire disposed in a plurality of helical coils, the several coils being disposed side by side, adjacent turns of each coil gripping the rear edge of the cross bar between them, the ends of said wire being directed downwardly and rearwardly to provide retaining prongs.

Signed by me at Auburn, New York, this 8th day of May, 1926.

WILLIAM J. DE WITT.